United States Patent
Fereyre et al.

(10) Patent No.: US 9,699,442 B2
(45) Date of Patent: Jul. 4, 2017

(54) METHOD FOR PRODUCING IMAGES WITH DEPTH INFORMATION AND IMAGE SENSOR

(71) Applicant: E2V Semiconductors, Saint-Égrève (FR)

(72) Inventors: Pierre Fereyre, Voreppe (FR); Bruno Diasparra, Seyssinet (FR); Vincent Prevost, Seyssinet (FR)

(73) Assignee: E2V SEMICONDUCTORS, Saint-Égrève (FR)

( * ) Notice: Subject to any disclaimer, the term of this patent is extended or adjusted under 35 U.S.C. 154(b) by 207 days.

(21) Appl. No.: 14/647,492

(22) PCT Filed: Nov. 14, 2013

(86) PCT No.: PCT/EP2013/073844
§ 371 (c)(1),
(2) Date: May 27, 2015

(87) PCT Pub. No.: WO2014/082864
PCT Pub. Date: Jun. 5, 2014

(65) Prior Publication Data
US 2015/0319422 A1 Nov. 5, 2015

(30) Foreign Application Priority Data
Nov. 27, 2012 (FR) ...................................... 12 61270

(51) Int. Cl.
*H04N 13/02* (2006.01)
*G01S 17/10* (2006.01)
(Continued)

(52) U.S. Cl.
CPC ......... *H04N 13/0271* (2013.01); *G01S 7/487* (2013.01); *G01S 7/4863* (2013.01);
(Continued)

(58) Field of Classification Search
CPC ........... H04N 13/0271; H04N 13/0296; H04N 13/0253; H04N 2013/0081; G01S 17/89; G01S 17/107; G01S 7/4865; G01S 7/4863; G01S 7/487
USPC .......................................................... 348/46
See application file for complete search history.

(56) References Cited

U.S. PATENT DOCUMENTS

| 7,382,008 B2 | 6/2008 | Xu |
| 7,626,685 B2 | 12/2009 | Jin et al. |

(Continued)

FOREIGN PATENT DOCUMENTS

| CN | 101438576 A | 5/2009 |
| CN | 101545771 A | 9/2009 |
| WO | 2008/084468 A2 | 7/2008 |
| WO | 2008/152647 A2 | 12/2008 |

OTHER PUBLICATIONS

Office action for China Application No. 201380069412.4, mailed Jun. 7, 2016.
(Continued)

*Primary Examiner* — Allen Wong
(74) *Attorney, Agent, or Firm* — Hauptman Ham, LLP; Sean A. Passino (57) ABSTRACT

The invention relates to the production of images associating with each point of the image a depth, i.e. a distance between the observed point and the camera that produced the image. A light source emits N trains of light pulses. For each train of rank I=1 to N, charge is integrated in a short time slot of length $T_{int}$ that starts with a temporal offset $t_i$ relative to the pulse, this temporal offset representing a journey time of the light pulse between the light source and the sensor after reflection from a point placed a distance $d_i$ from the sensor. The temporal offset $t_i$ is the same for all the light pulses of the $i^{th}$ pulse train but the temporal offsets $t_i$ of the N trains are different from one another in order to correspond to various distances relative to the sensor. The charge photo-generated by the pulses of a given train is accumulated; then the accumulated charge is read in order to produce an image of rank i representing the pixels located at the distance $d_i$. The observation of a scene comprises producing N different images by virtue of which it is possible to associate a distance with each pixel.

10 Claims, 4 Drawing Sheets

(51) Int. Cl.
*G01S 17/89* (2006.01)
*G01S 7/486* (2006.01)
*G01S 7/487* (2006.01)
*H04N 13/00* (2006.01)

(52) U.S. Cl.
CPC .......... *G01S 7/4865* (2013.01); *G01S 17/107* (2013.01); *G01S 17/89* (2013.01); *H04N 13/0253* (2013.01); *H04N 13/0296* (2013.01); *H04N 2013/0081* (2013.01)

(56) References Cited

U.S. PATENT DOCUMENTS

| | | |
|---|---|---|
| 2004/0233416 A1 | 11/2004 | Doemens et al. |
| 2010/0128109 A1 | 5/2010 | Banks |
| 2010/0214554 A1 | 8/2010 | Audier et al. |
| 2011/0235897 A1* | 9/2011 | Watanabe .......... G06K 9/00214 382/154 |
| 2013/0234029 A1* | 9/2013 | Bikumandla ......... H01L 25/043 250/349 |
| 2014/0118255 A1* | 5/2014 | Billerbeck .............. G06F 3/017 345/158 |

OTHER PUBLICATIONS

International Search Report for PCT/EP2013/073844, dated Feb. 11, 2014.

* cited by examiner

METHOD FOR PRODUCING IMAGES WITH DEPTH INFORMATION AND IMAGE SENSOR

FIELD

The invention relates to the production of images associating with each point of the image a depth, i.e. a distance between the observed point and the camera that produces the image.

DESCRIPTION OF THE PRIOR ART

The production of images with an associated depth is notably but not exclusively used to create stereograms: in this application, it is for example possible to produce an image using a camera, and to obtain depth values associated with each point; then, from this single image, it is possible to produce a left-hand image and a right-hand image that are different from each other; a point of the scene occupies the same position in the left-hand and right-hand images if it is at infinity; if it is closer to the camera, it occupies different positions that are shifted laterally by a distance that increases in proportion to how close the point is to the camera. The left-hand and right-hand images, which are projected simultaneously but which are each observed by a respective eye, give the impression of depth. Most often, the depth is obtained by two cameras that are spaced apart from each other. The invention proposes a solution that uses only one camera.

In another application, it is sought to establish an image with associated depths in order to detect obstacles. Knowledge of the distance between an obstacle and an automotive vehicle may be used to prevent collisions. This is in particular the case if the image is taken with infrared light as then detection is possible even in the case of fog. In this case, the depth information, which represents the distance between the camera and the obstacle or portions of the obstacle, is of major importance.

SUMMARY

To allow these objectives to be achieved using a single camera, the present invention provides a method for producing images of a three-dimensional scene including information on the distance of each point of the scene, this method using a pulsed light source and an image sensor, the sensor comprising pixels able to accumulate, in a respective storage node of each pixel, charge generated by the light, the method comprising emitting N successive trains of light pulses from the light source and under the control of a reference clock, N being an integer representing the number of depth levels desired for the depth information, and, iteratively for each pulse train of rank i from the N pulse trains:

a) emitting the $i^{th}$ train of light pulses, the pulses being emitted at instants determined using the reference clock and at intervals determined using this clock;

a1) integrating charge for each light pulse of the $i^{th}$ train in a short integration time slot of length $T_{int}$ starting with a temporal offset $t_i$ relative to the pulse, this temporal offset representing a journey time of the light pulse between the light source and the sensor after reflection from a point located at an $i^{th}$ distance ($d_i$) from the sensor, the $i^{th}$ temporal offset $t_i$ being the same for all the light pulses of the $i^{th}$ pulse train and the values of the temporal offsets $t_i$ for the N trains being different from one another in order to correspond to the various distances relative to the sensor and being spaced apart from one another by a time increment larger than the integration time $T_{int}$;

b1) transferring the charge integrated for each light pulse of the $i^{th}$ train to the charge storage node of each pixel, and accumulating this charge with the charge resulting from the preceding light pulses of the same train; and b) reading the charge contained in the storage node of each pixel after the end of the $i^{th}$ pulse train, resetting the storage node, and delivering a respective image of rank i representing the points of a scene located at the $i^{th}$ distance ($d_i$) from the sensor.

In other words, each pulse train is intended to observe points of the scene that are located at a well-defined distance $d_i$, the other points being excluded from this observation. Points closer than the distance $d_i$ are not seen because the light pulse reflected by these points arrives before the instant $t_i$, i.e. before the charge integration time slot (from $t_i$ to $t_i+T_{int}$) has started. Points further away are not seen because the light pulse reflected by these points arrives too late, after the charge integration time slot has closed.

The charge integration time slot of length $T_{int}$, which slot is synchronized relative to the light pulse, is preferably located between the end of a photodiode reset signal common to all the pixels, and the end of a charge transfer signal common to all the pixels. The charge transfer signal permits the transfer of charge from a photodiode of a pixel to a charge storage node thereof. The reset signal empties charge from the photodiode and prevents charge from being integrated therein.

The light pulses are brief and the charge integration time slots are also brief because it is this brevity that enables precise location of the distance $d_i$. The length of the integration slots must be smaller than the difference between two neighboring temporal offsets such as $t_i$ and $t_{i+1}$ if it is desired to distinguish correctly the corresponding neighboring distances $d_i$ and $d_{i+1}$. There are (if possible) many light pulses in each pulse train in order to compensate for their brevity and ensure that cumulatively a sufficient number of photons is received before the charge accumulated in the storage node of each pixel is read at the end of the pulse train.

In theory, a signal is delivered by a pixel for a given pulse train if a point of the scene observed by this pixel is located at the distance $d_i$ associated with this train, whereas no signal is delivered if this point of the scene is not at this distance. The level of the signal delivered, representing the amount of charge accumulated at the end of the pulse train, is roughly proportional to the reflective power or albedo of the point; however, the signal level degrades if the distance from this point is such that the return of the reflective pulse coincides only partially with the charge integration slot.

At the end of N pulse trains, N images of the scene are obtained, each image being associated with depth information; and, on the basis of these images and the associated depth information, depth information is obtained for each pixel. The resulting information may be transmitted either in the form of N images representing N planes of view corresponding to N different distances, or even in the form of a single image combining the luminances of the N images, added pixel by pixel, said image being associated with a matrix of distances representing, for each pixel, the distance associated with this pixel, i.e. the distance of the point of the scene portion observed by the pixel.

The distance associated with the pixel may be the only distance $d_i$ for which the pixel received a signal, or the distance for which the pixel received the strongest signal in the N images. However, it may also be, as will be described below, a distance calculated by interpolation if the pixel received a nonzero signal for a plurality of different distances.

The temporal offset values $t_i$ differ from each other by a value that may be said to be the "time increment" of the values $t_i$. If the length of a light pulse is $T_{imp}$ and if the length of a charge integration time slot is $T_{int}$, then the time increment of the values $t_i$, which defines the depth resolution, is preferably equal to the sum of the times $T_{imp}$ and $T_{int}$. These two times may be equal or roughly equal. If the increment between two offsets $t_i$ is larger than the sum $T_{imp}+T_{int}$, there is a risk of missing reflections from points located between a distance $d_i$ and a distance $d_{i+1}$. If the increment is smaller, a point located roughly at the distance $d_i$ may respond to the pulse train of rank i corresponding to this distance $d_i$, but also to the pulse train of rank i−1 or i+1, and this may make it difficult to discriminate the most relevant distance value from the plurality of possible values.

In all the cases where a given pixel receives a nonzero signal for a plurality of different pulse trains, it is best to establish distance information for this pixel on the basis of the various responses, for example by selecting the distance for which the response is strongest, or even by calculating a distance by interpolation of the distances for which a signal was received by a pixel: for example, a distance may be calculated by interpolation weighted over three values, i.e. the distance $d_i$ corresponding to the pulse train of rank i for which the signal read has the highest value and the signals read for this pixel and corresponding to the distances $d_{i-1}$ and/or $d_{i+1}$, by assigning to each distance a weight corresponding to the received signal level. The interpolation may be carried out over five or even more consecutive distances.

Then a matrix of numerical distance values is established associating with each pixel of the sensor a distance of that point of the scene which is observed by this pixel.

Apart from the image producing method summarized above, the invention also relates to an image-capturing apparatus comprising a matrix array image sensor and a light source able to deliver light pulses, the apparatus delivering an image of a scene and information on the distance associated with each pixel of the matrix array, each pixel comprising a photodiode, means for resetting the photodiode, means for storing charge in the pixel, and means for reading the charge accumulated in the storage node, the light source comprising means for delivering N trains of light pulses, the pulses being of calibrated length and having calibrated intervals, the apparatus furthermore comprising sequencing means for controlling the resetting of the photodiode and the transfer of charge from the photodiode to the storage node, the sequencing means being synchronized relative to the light pulses, characterized in that the sequencing means are arranged to integrate, for each of the N trains of light pulses, charge in a short time slot offset relative to each light pulse by a temporal offset ($t_i$) that is identical for all the light pulses of a given pulse train of rank i and different from that of the other pulse trains, the temporal offset corresponding to the journey time of the light between the light source and the sensor after reflection from a point of the scene, which point is located at a respective distance $d_i$, the charge integrated following the illumination by the pulses of a given pulse train of rank i being accumulated in the storage node, then read from this node in order to produce an image of rank i of the points of the scene located at a distance $t_i$, this charge being removed at the end of the pulse train with a view to a new accumulation for another pulse train of rank i+1 corresponding to another distance $d_{i+1}$.

The length of a short time slot is smaller than the difference between two neighboring temporal offset values corresponding to two different pulse trains.

BRIEF DESCRIPTION OF DRAWINGS

Other features and advantages of the invention will become apparent on reading the following detailed description, given with reference to the appended drawings in which.

DESCRIPTION OF EMBODIMENTS

Figure 1:
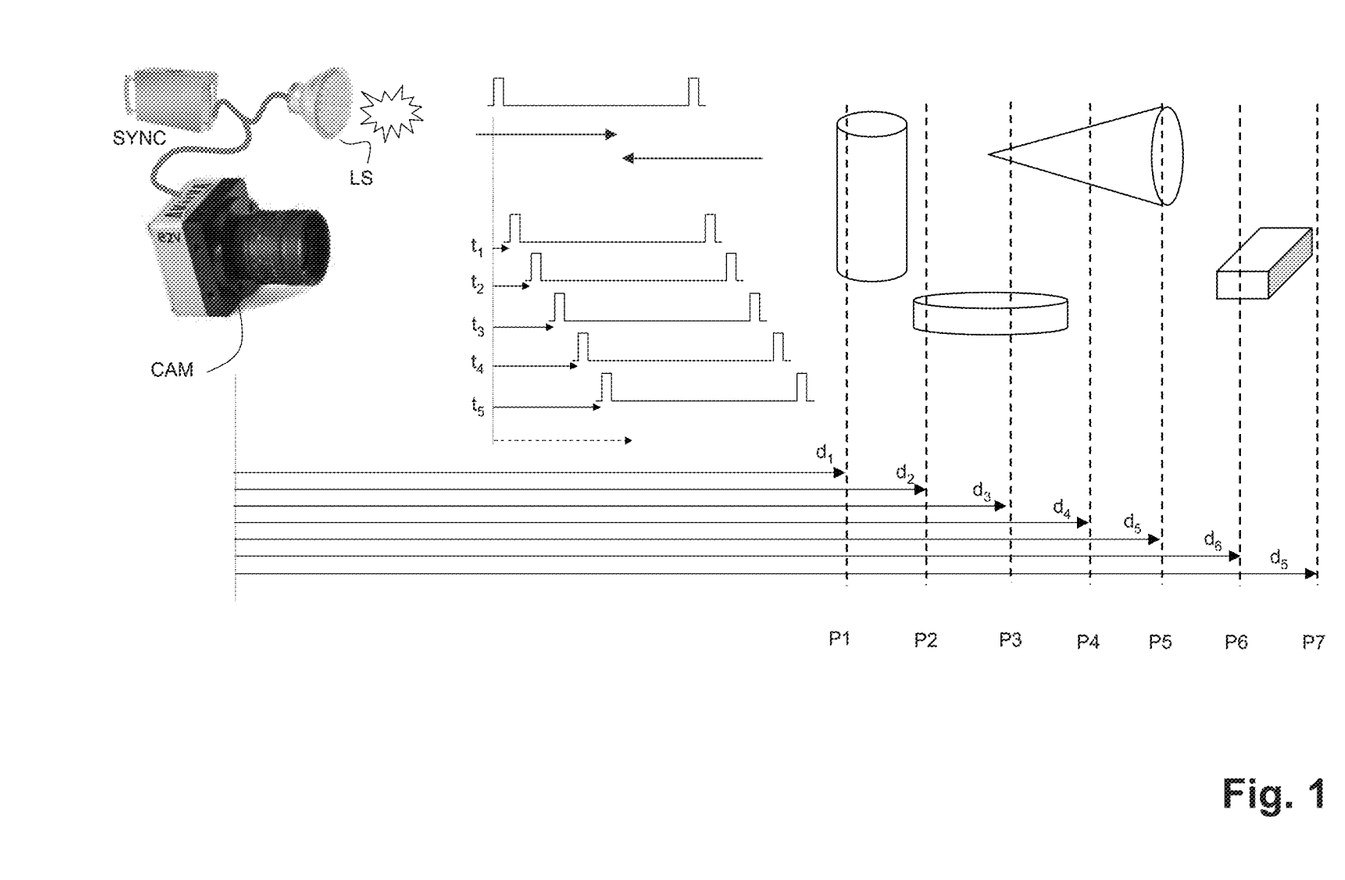
FIG. 1 shows the general principle of the production of images of a scene with distance information according to the invention.

The method according to the invention is schematized in FIG. 1. It uses a camera CAM associated with a pulsed light source LS, operation of the image sensor of the camera being synchronized relative to the operation of the light source. The light source may be a source of near infrared light, especially in the case of production of images intended for observation or detection of obstacles in fog. The camera comprises an objective and an image sensor. The sensor comprises a matrix of active pixels and internal sequencing circuits for establishing internal control signals and especially row and column control signals that allow photogenerated charge to be integrated and then this charge to be read.

In FIG. 1, the camera and the light source are shown as two separate objects but the light source may also be incorporated into the casing of the camera. Control means that synchronize the operation of the image sensor relative to the pulsed operation of the light source are provided. They may form part of the light source, or of the camera, or of an electronic circuit SYNC connected both to the camera and to the light source. These control means comprise a reference clock that is used by the sequencing circuits of the image sensor to obtain the synchronization.

A scene has been shown, in front of the camera, comprising objects generating depth, i.e. the various parts of the scene are not all located the same distance from the camera.

The light source emits brief light pulses. When a pulse is emitted, it is reflected by the objects of the scene and the pulse reflected by an object or a portion of an object located in an observation plane $P_i$ at a distance $d_i$ returns to the image sensor with a delay $t_i$ proportional to this distance. The light source is assumed to be at the same distance $d_i$ as the image sensor. The time $t_i$ is then equal to $2d_i/c$ where c is the speed of light.

Assuming that it is desired to observe those points of the scene which are located at distances $d_i$ distributed in a given range of distances ranging from $d_i$ (closest distance) to $d_N$ (furthest distance), it is therefore possible to determine a distance of a point of the scene by determining the time that passes between the emission of a pulse and the return of this pulse after reflection from the point observed by a pixel.

By choosing to form an image by integrating charge photogenerated in a very narrow time slot corresponding only to the instant of return of a brief pulse reflected by those points of the scene which are located in a plane $P_i$, at a distance $d_i$, an image that contains only those points of the scene which are located in this plane is produced.

Figure 2:
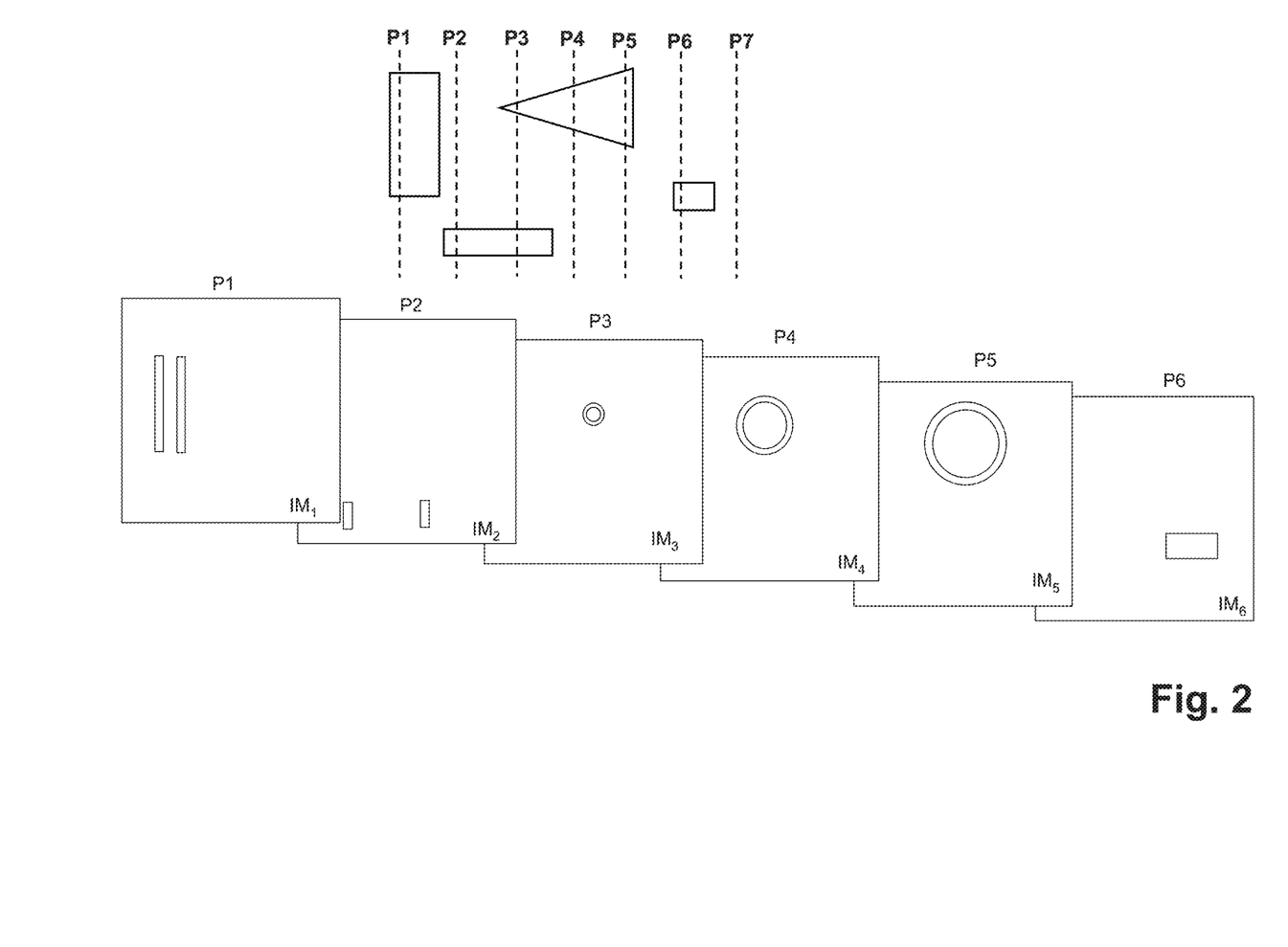
FIG. 2 shows successive images produced from the scene in FIG. 1.

FIG. 2 illustrates for a number of planes $P_i$, here for example the planes $P_1$ to $P_6$, the various images $IM_1$ to $IM_6$ that would be obtained with the sensor if, for each image, only the light signal arriving at the instant $t_i$ were collected, i.e. if only the object portions located in the plane $P_i$ at the distance $d_i$ were observed.

According to the invention, N successive images of the scene are produced, each image corresponding only to a given plane $P_i$. Distance information is therefore intrinsically contained in the succession of images obtained since it is possible to associate with each pixel of the sensor, depending on whether or not it delivers a signal in the various images or depending on the value of this signal in the various images, a distance relative to the camera.

Figure 3:
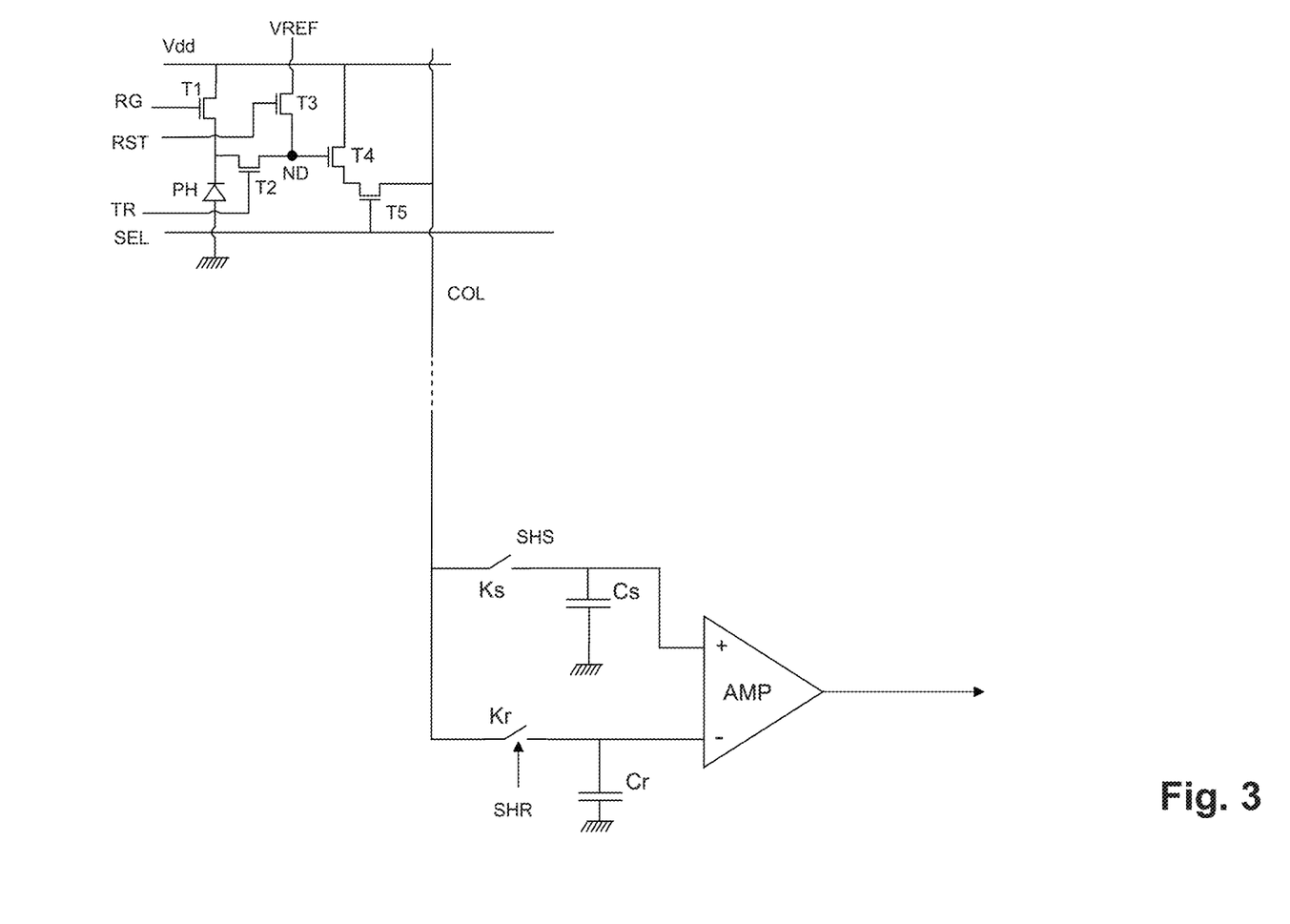
FIG. 3 shows the architecture of a pixel and read circuit for implementing the invention.

Before describing the way in which these images are taken, in FIG. 3 the conventional architecture of a matrix image sensor pixel in CMOS technology and its read circuit is recalled, this pixel and circuit making it possible to implement the invention.

The pixel conventionally comprises a photodiode PH and a charge storage node ND in which it is possible to store charge generated by the photodiode in an integration time $T_{int}$. The pixel moreover comprises a plurality of MOS transistors that are used to control the pixel, to define the integration time and to extract a signal representing the amount of charge stored in the integration time.

More precisely, the pixel comprises:

a transistor T1 that allows the potential of the photodiode to be reset before a new integration period of length $T_{int}$ is started; this transistor is controlled by a global reset signal RG common to all the pixels of the matrix; the end of the RG signal defines the start of the integration time $T_{int}$.

a charge transfer transistor T2 that allows the charge generated after an integration time $T_{int}$ to be emptied into the storage node ND; this transistor is controlled by a charge transfer signal TR that may be common to all the pixels; the end of this signal defines the end of the integration time $T_{int}$;

a reset transistor T3 that allows the potential of the storage node to be reset after the amount of charge stored therein has been read; this transistor is controlled by a reset signal RST that may be common to all the pixels;

a read transistor T4 that is connected as a voltage follower and that allows the potential of the charge storage node to be transferred from its gate to its source;

and lastly a selecting transistor T5 that is connected to the source of the transistor T4 and that allows the potential of the charge storage node to be transferred to a column conductor COL (common to the pixels of a given column of the matrix) when it is desired to read the amount of charge stored in the charge storage node; this transistor is controlled by a row selecting signal SEL common to all the pixels of a row; the pixels are read row by row.

The read circuit, external to the matrix of pixels and connected to the various column conductors, comprises a sampling circuit that samples, for example into two capacitors Cr and Cs, the potential of the column conductor using switches Kr and Ks, at an instant when the storage node has been reset to zero and an instant when it is desired to determine the amount of charge accumulated in the storage node, respectively. The difference between the potentials sampled into the capacitors represents the amount of charge accumulated. It may be read by a differential amplifier AMP, then digitized, or directly digitized, for example using a counter, a linear voltage ramp, and a comparator.

Together, all the digital signals collected for all the pixels of the matrix, read in succession row by row, form an image of the scene.

Figures 4, 5:
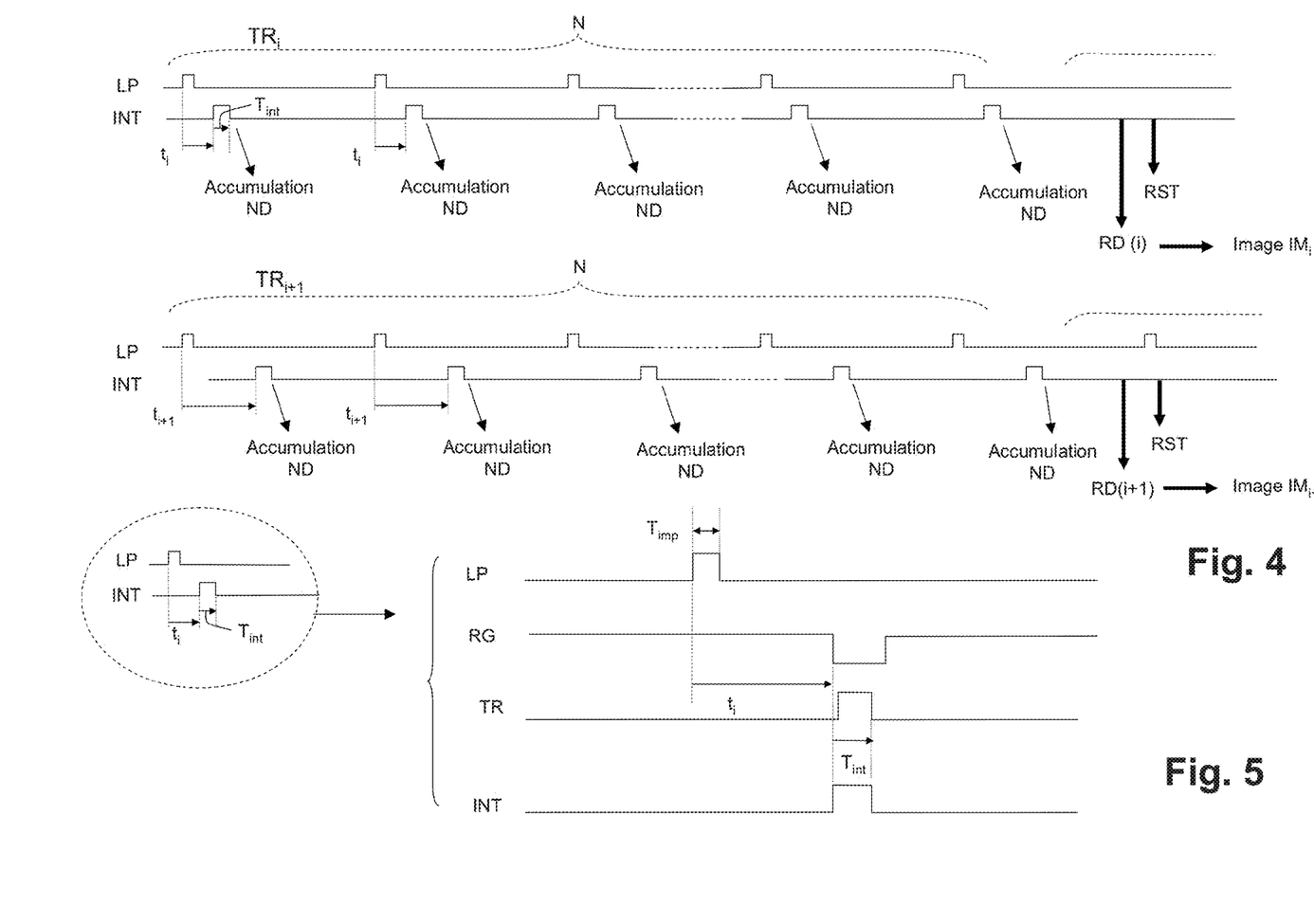
FIG. 4 shows a timing diagram showing the method in operation.
FIG. 5 shows in detail the synchronization of signals to establish an integration time slot following a light pulse.

FIG. 4 illustrates a timing diagram allowing N successive images showing elements located at various distances in a scene to be produced. The waveform LP represents the light pulses. The waveform INT represents the integration periods of the image sensor following each pulse.

N images are obtained by producing N trains $TR_i$ of light pulses, where i is an integer index from 1 to N, and where N is the number of planes $P_i$ (each located at a different distance $d_i$) for which it is desired to take an image. Each pulse train contains a plurality of pulses that are regularly distributed over the length of the pulse train.

The pulse rate is set by a reference clock (not shown) which may form part of the sensor or of the light source or of the control means mentioned above, and which serves to synchronize the operation of the light source and that of the sensor.

For each pulse of a pulse train $TR_i$, the image sensor collects the charges photogenerated in an integration time slot of length $T_{int}$. If (for each pulse) the start of the pulse is taken as a temporal reference, the time slot of length $T_{int}$ starts at an instant $t_i$ and terminates at an instant $t_i+T_{int}$. The value $t_i$ is therefore the temporal offset between the light pulse and the start of the integration slot. It represents the distance travelled by the light pulse to reach the plane $P_i$ and return to the sensor. The charge generated by the light during this time $T_{int}$ is stored in the storage node ND of each pixel at the end of the slot. This charge is accumulated with the charge already stored in this node, the latter charge resulting from other pulses of the same train $TR_i$. The time $t_i$ and the time $T_{int}$ are the same for all the pulses of the train $TR_i$.

At the end of the pulse train $TR_i$, i.e. after the instant $t_i+T_{int}$ following the last pulse of the train $TR_i$, the charge accumulated in the storage nodes of all the pixels is read row by row. This read operation $RD_i$ produces an image $IM_i$ of rank i.

The storage nodes are then all reset by a signal RST.

The information contained in the image $IM_i$ is essentially the amount of light in the pulse reflected by object portions located at the distance $d_i$ or in the vicinity of this distance. Here, it is assumed that ambient illumination levels are negligible relative to the illumination delivered by the pulsed light source.

Another train $TR_{i+1}$ of light pulses then starts. The integration time $T_{int}$ for the pulses of the train $TR_{i+1}$ is preferably the same as for the train $TR_i$. However, the delay $t_{i+1}$ before which this integration time starts is different from the delay $t_i$, and it corresponds to a distance $d_{i+1}$ different from $d_i$. The charge generated in the photodiodes during the time interval from $t_{i+1}$ to $t_{i+1}+T_{int}$ that follows a light pulse is stored in respective storage nodes and accumulated in these nodes with the charge generated by the other light pulses of the same train $TR_{i+1}$.

An image $IM_{i+1}$ is read after the last pulse has been received. Then the storage nodes are again reset.

And so on, N pulse trains are emitted and give rise to N images $IM_1$ to $IM_N$, this set of N images both allowing the scene to be observed, the signal level of each pixel of the image depending on the albedo of the point observed by this pixel, and providing distance information associated with each pixel of the image i.e. the distance corresponding to the image in which this pixel delivered a maximum signal level.

FIG. 5 shows the way in which the integration slots are produced in practice.

The waveform LP represents the emission of a light pulse of length $T_{imp}$.

The waveform RG represents the global reset signal of the photodiodes of the sensor, which prevents integration of charge in the photodiode as long as it is at its high level, and which permits it when it terminates, i.e. when it drops back to its low level. The falling edge of the reset signal RG, i.e. the end of the signal, is triggered with a temporal offset $t_i$ after the start of the light pulse. This falling edge defines the start of the integration time $T_{int}$.

The signal TR defines the transfer of charge from the photodiode to the storage node. The start of this signal is posterior to or simultaneous with the end of the reset signal. It is the end of this transfer signal that defines the end of the transfer and therefore the end of the integration time. This occurs after a time $T_{int}$ following the end of the reset signal RG.

The waveform INT represents the integration time that results therefrom.

In the above, the case was considered where the temporal offset $t_i$ between the light pulse and the integration time slot was more precisely an offset between the start of the light pulse and the start of the charge integration in the photodiodes of the sensor. However, it is possible to envision measuring this offset in a different way, for example between the middle of the light pulse and the middle of the integration slot $T_{int}$. The way chosen may for example depend on the relative lengths of the times $T_{int}$ and $T_{imp}$, which are not necessarily equal.

It will be understood that the distance resolution, i.e. the pitch separating the various observation planes $P_i$, depends on the separation between the various temporal offset values $t_i$, $t_{i+1}$, etc. corresponding to the various pulse trains. The difference between a value $t_i$ and the following value $t_{i+1}$ or the preceding value $t_{i-1}$ may be said to be the "time increment between the various values $t_i$".

The higher the required resolution, the more closely spaced the offset values must be to one another.

However, when the offset values $t_i$ are closely spaced to one another, it is necessary to avoid running the risk of an integration slot starting at the time $t_i$ coinciding not only with a pulse reflected by the plane $P_i$ but also with a pulse reflected by the plane $P_{i+1}$ or $P_{i-1}$. This risk exists if the pulses are too long or if the integration slots are too long. In practice, it is necessary to separate the values of the times $t_i$ and $t_{i+1}$ by a time increment at least equal (and preferably equal or roughly equal in order not to leave any planes unobserved) to the sum of the length $T_{imp}$ of the light pulse and the length $T_{int}$ of the integration slot.

The length of time that separates two pulses in the pulse train is in principle such that it is possible to measure N times $(T_{imp}+T_{int})$ between two successive light pulses, N being the number of desired images and therefore the number of different distances observed. This time is therefore at least $N \cdot (T_{imp}+T_{int})$. If there are Z pulses in the train, the length of the train is $Z \cdot N \cdot (T_{imp}+T_{int})$. Furthermore, as there are N pulse trains, the time taken to obtain an overall image, i.e. to obtain N images $IM_1$ to $IM_N$, is $Z \cdot N^2 \cdot (T_{imp}+T_{int})$.

The length of a light pulse is preferably smaller than or equal to the integration time as otherwise some light energy will be systematically lost in the sensor even if the pulse is reflected exactly from the plane $P_i$ corresponding to the pulse train. For the sake of maximization of the sensitivity of the sensor, $T_{int}$ is advantageously set roughly equal to $T_{imp}$.

The number of pulses in each pulse train will be limited by the production rate desired for the overall image and by the capacity of the apparatus to produce very short light pulses and implement very short integration times. The shorter the pulses the more pulses each pulse train will contain. The higher the desired rate, the fewer the pulses in each train.

By way of example, if a distance resolution pitch of 3 meters is desired over a distance of 30 meters between the shortest distance $d_1$ and the longest distance $d_N$, with therefore N=10, it is necessary to use a time $T_{imp}+T_{int}$ smaller than or equal to 20 nanoseconds (round trip for the light of 6 meters in 20 nanoseconds), i.e. in practice 10 nanoseconds for $T_{imp}$ and 10 nanoseconds for $T_{int}$. The time between two pulses of a train is then 200 nanoseconds. If there are 10 pulses per train, the total length of the N trains is 20 milliseconds, this giving the rate at which it is possible to produce an overall image comprising N images.

With a slower rate, it is possible to increase the range of observed distances, and/or the number Z of pulses per pulse train. The maximum length of the light pulses and of the integration slots is fixed by the distance resolution, i.e. the distance between two successive observed planes: the sum $(T_{imp}+T_{int})$ must be smaller than or equal to $2 \cdot (d_{i+1}-d_i)/c$, c being the speed of light.

Increasing the number of pulses in a pulse train allows the sensitivity of the sensor to be increased.

The level of the digital signal issued from a pixel for a given image $IM_i$ depends on the albedo (reflective power) of the point of the scene that reflected the light pulse, and that is therefore on the whole in the plane $P_i$ observed by this image produced by the $i^{th}$ pulse train. However, the light pulses are nonzero in length; the integration time slots are also nonzero in length. A light source may coincide only partially with the time slot that corresponds thereto, for example because the point observed by the pixel is not exactly at the distance $d_i$ but at a distance slightly larger or smaller than $d_i$. In this case, the signal level obtained is lower than it should be given the albedo of the point.

In order to associate a distance with each pixel, it is simplest to consider the N images and to select the image $IM_i$ for which the signal level delivered by this pixel is the highest among the various values for the same pixel in the N images. The associated distance is the distance $d_i$.

However, more precisely, to increase the precision of the distance measurement, it may be preferable to carry out a weighted interpolation of a plurality of images in the following way: the image $IM_i$ for which the signal level of the pixel is highest and the neighboring images $IM_{i-1}$ and $IM_{i+1}$ are selected, and an average distance, namely the normalized weighted sum $(a \cdot d_{i-1}+b \cdot d_i+c \cdot d_{i+1})$ of the distances $d_{i-1}$, $d_i$ and $d_{i+1}$, is calculated, a, b, and c representing the relative signal levels of the pixel in the three images normalized to 1, i.e. (a+b+c)=1.

The weighting may be carried out over a larger number of consecutive images, for example over 5 images, using the same principle.

The output of the camera may consist of a group of N images, the processing allowing a distance to be associated with each pixel being carried out externally to the camera. Alternatively, provision may be made in the camera for means for making this association in accordance with the principles described above. In this case, the camera delivers, on the one hand, an image of luminances, and on the other hand, a matrix of distances associating a distance value with each pixel. The luminance image consists of a numerical luminance value for each pixel. This value may be the maximum value obtained for this pixel in the N images. However, it may be obtained in other ways, for example by a concatenation of the various numerical values obtained in the N images. This concatenation may for example be the sum of the numerical values detected in the N images, or the sum of numerical values exceeding a minimum threshold (in order to prevent noising by weak signals that do not necessarily correspond to a veritable reflected light pulse).

Lastly, to produce a stereogram, it is also possible to process the luminance image matrix and the matrix of distances in order to reconstruct a binocular image, i.e. a left-hand image and a right-hand image that are transformations of the luminance image such that the luminance value assigned to a pixel of the luminance matrix is assigned to a pixel of the left-hand image and a pixel of the right-hand image that are offset one relative to the other (relative to the lateral edges of the matrix of pixels) by a given distance that increases as the associated distance delivered by the camera for this pixel decreases.

The invention claimed is:

1. A method for producing N images of a three-dimensional scene where each image of rank i, i=1 to N, represents points of a scene located at a respective distance $d_i$ from an image sensor, the method using a pulsed light source, the image sensor comprising pixels able to accumulate, in a respective charge storage node of each pixel, charge generated by light, the method comprising emitting N successive trains of light pulses from the light source and under control of a reference clock, and, iteratively for each pulse train of rank i from the N successive trains of light pulses:
    a) emitting the $i^{th}$ train of light pulses, the pulses being emitted at instants determined using the reference clock and at intervals determined using said reference clock;
        a1) integrating charge for each light pulse of the $i^{th}$ train in a short integration time slot of length $T_{int}$ starting with a temporal offset $t_i$ relative to the pulse, the temporal offset representing a journey time of the light pulse between the light source and the sensor after reflection from a point located at the respective $i^{th}$ distance ($d_i$) from the sensor, the temporal offset $t_i$ being the same for all the light pulses of the $i^{th}$ pulse train and the values of the temporal offsets $t_i$ for the N trains being different from one another in order to correspond to various distances relative to the sensor and being spaced apart from one another by a time increment larger than the integration time $T_{int}$;
        b1) transferring the charge integrated for each light pulse of the $i^{th}$ train to the charge storage node of each pixel, and accumulating the charge with the charge resulting from the preceding light pulses of the same train; and
    b) reading the charge contained in the charge storage node of each pixel after the end of the $i^{th}$ pulse train, resetting the charge storage node, and delivering a respective image of rank i representing the points of the scene located at the $i^{th}$ distance ($d_i$) from the sensor.

2. The method as claimed in claim 1, wherein the values of the temporal offsets $t_i$ are spaced apart from each other by a time increment roughly equal to the sum of a length $T_{imp}$ of a light pulse and the integration time $T_{int}$.

3. The method as claimed in claim 1, wherein the length of a light pulse is substantially equal to the integration time $T_{int}$.

4. The method as claimed in claim 1, wherein a matrix of numerical distance values is established associating with each pixel of the sensor a distance of that point of the scene which is observed by the pixel.

5. The method as claimed in claim 4, wherein the distance associated with the pixel is the distance $d_i$ corresponding to the pulse train for which the signal issued from the pixel has the highest value among the various values for the given pixel in the N images.

6. The method as claimed in claim 4, wherein the distance associated with each pixel is calculated by interpolation
    from the distance $d_i$ corresponding to the pulse train of rank i for which the signal read for the pixel has the highest value,
    and from signals read for the pixel and corresponding to the distances distance $d_{i-1}$ and/or $d_{i+1}$.

7. The method as claimed in claim 1, wherein for each observation of a scene a value is established for the luminance received by each pixel.

8. The method as claimed in claim 7, wherein the value of the luminance received by a pixel is established on the basis of the highest signal level delivered by the pixel in the N images, or on the basis of a sum of signal levels delivered by the pixel in a plurality of images.

9. The method as claimed in claim 1, wherein, from the N images, two electronic images, namely a left-hand image and a right-hand image allowing a stereoscopic reconstruction of the scene to be obtained, are established.

10. An image-capturing apparatus comprising a matrix array image sensor and a light source able to deliver light pulses, the apparatus delivering N images of a three-dimensional scene where each image of rank I, I=1 to N, represents points of the scene located at a respective distance $d_i$ of the sensor, each pixel comprising a photodiode, means for resetting the photodiode, means for storing charge in the pixel, and means for reading the charge accumulated in the storage node, the light source comprising means for delivering N trains of light pulses, the pulses being of calibrated length and having calibrated intervals, the apparatus furthermore comprising sequencing means for controlling the resetting of the photodiode and the transfer of charge from the photodiode to the storage node, the sequencing means being synchronized relative to the light pulses, wherein the sequencing means are arranged to integrate, for each of the N trains of light pulses, charge in a short time slot offset relative to each light pulse by a temporal offset that is identical for all the light pulses of a given pulse train of rank i and different from that of the other pulse trains, the temporal offset corresponding to the journey time of the light between the light source and the sensor after reflection from a point of the scene, which point is located at a respective distance $d_i$, the charge integrated following the illumination by the pulses of a given pulse train of rank i being accumulated in the storage node, then read from the node in order to produce an image of rank i of the points of the scene located at a distance $d_i$, the charge being removed at the end of the pulse train with a view to a new accumulation for another pulse train of rank i+1 corresponding to another distance $d_{i+1}$, the length of a short time slot being smaller than the difference between two neighboring temporal offset values corresponding to two different pulse trains.

* * * * *